(12) United States Patent
Lyu et al.

(10) Patent No.: US 10,901,906 B2
(45) Date of Patent: Jan. 26, 2021

(54) WRITE DATA ALLOCATION IN STORAGE SYSTEM

(71) Applicant: International Business Machines Corporation, Armonk, NY (US)

(72) Inventors: Gang Lyu, Shanghai (CN); Hui Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 16/056,908

(22) Filed: Aug. 7, 2018

(65) Prior Publication Data

US 2020/0050552 A1    Feb. 13, 2020

(51) Int. Cl.
*G06F 12/0877* (2016.01)
*G06F 12/1045* (2016.01)

(52) U.S. Cl.
CPC ...... *G06F 12/0877* (2013.01); *G06F 12/1045* (2013.01); *G06F 2212/603* (2013.01)

(58) Field of Classification Search
CPC .......... G06F 12/0804; G06F 12/0815; G06F 2212/1016; G06F 2212/1041; G06F 2201/885; G06F 2212/205; G06F 2212/222; G06F 3/061; G06F 12/0877; G06F 12/1045; G06F 2212/603; G06F 2212/604
USPC ........................................................ 711/118
See application file for complete search history.

(56) References Cited

U.S. PATENT DOCUMENTS

| 5,893,121 A * | 4/1999 | Ebrahim ............. G06F 12/0253 |
| 2008/0162822 A1* | 7/2008 | Okuyama ........... G06F 12/0866 711/134 |
| 2011/0191534 A1 | 8/2011 | Ash et al. |
| 2012/0124294 A1 | 5/2012 | Atkisson et al. |
| 2012/0198174 A1* | 8/2012 | Nellans ............... G06F 12/0804 711/133 |
| 2013/0132667 A1 | 5/2013 | Benhase et al. |
| 2014/0143505 A1 | 5/2014 | Sim et al. |
| 2017/0115894 A1 | 4/2017 | Sterns |
| 2017/0132154 A1 | 5/2017 | Bakke et al. |
| 2018/0275898 A1* | 9/2018 | Bhansali ............... G06F 3/0608 |
| 2019/0369874 A1* | 12/2019 | Barrell .................. G06F 16/188 |

FOREIGN PATENT DOCUMENTS

WO    2016141800 A1    9/2016

* cited by examiner

*Primary Examiner* — Hashem Farrokh
(74) *Attorney, Agent, or Firm* — Kunzler Bean & Adamson

(57) ABSTRACT

This disclosure provides a method, a computing system and a computer program product for allocating write data in a storage system. The storage system comprises a Non-Volatile Write Cache (NVWC) and a backend storage subsystem, and the write data comprises first data whose addresses are not in the NVWC. The method includes checking fullness of the NVWC, and determining at least one of a write-back mechanism or a write-through mechanism as a write mode for the first data based on the checked fullness.

20 Claims, 5 Drawing Sheets

WRITE DATA ALLOCATION IN STORAGE SYSTEM

FIELD

The present invention relates to storage system, and more specifically, to allocation of write data in a storage system.

BACKGROUND

A storage system typically comprises a volatile cache, a non-volatile write cache (NVWC) and a backend storage subsystem. Usually, when write data sent from a host arrives, the data is first written into the NVWC and a write completion message is returned to the host. Then the data stored in the NVWC can be destaged to the backend storage subsystem at a later time. Only when the data has been destaged from the NVWC to the backend storage subsystem, the data can be discarded from the NVWC and the corresponding space in the NVWC can be released.

SUMMARY

Disclosed herein are embodiments of a method, computing system and computer program product for allocating write data in a storage system.

According to one embodiment of the present invention, there is provided a computer-implemented method for allocating write data in a storage system. The storage system comprises a Non-Volatile Write Cache (NVWC) and a backend storage subsystem, and the write data comprises first data whose addresses are not in the NVWC. The method comprises: checking fullness of the NVWC; and determining at least one of a write-back mechanism or a write-through mechanism as a write mode for the first data based on the checked fullness.

According to another embodiment of the present invention, there is provided a computing system. The computing system comprises a processor and a computer-readable memory unit coupled to the processor, the memory unit comprising instructions, when executed by the processor, for allocating write data in a storage system. The storage system comprises a Non-Volatile Write Cache (NVWC) and a backend storage subsystem, and the write data comprises first data whose addresses are not in the NVWC. The instructions for allocating the write data in the storage system further comprise instructions for: checking fullness of the NVWC; and determining at least one of a write-back mechanism or a write-through mechanism as a write mode for the first data based on the checked fullness.

According to another embodiment of the present invention, there is provided a computer program product. The computer program product comprises a computer readable storage medium having program instructions embodied therewith, the program instructions executable by a processor to cause the processor to allocate write data in a storage system. The storage system comprises a Non-Volatile Write Cache (NVWC) and a backend storage subsystem, and the write data comprises first data whose addresses are not in the NVWC. The instructions to cause the processor to allocate the write data in the storage system further comprise instructions to cause the processor to perform actions of: checking fullness of the NVWC; and determining at least one of a write-back mechanism or a write-through mechanism as a write mode for the first data based on the checked fullness.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
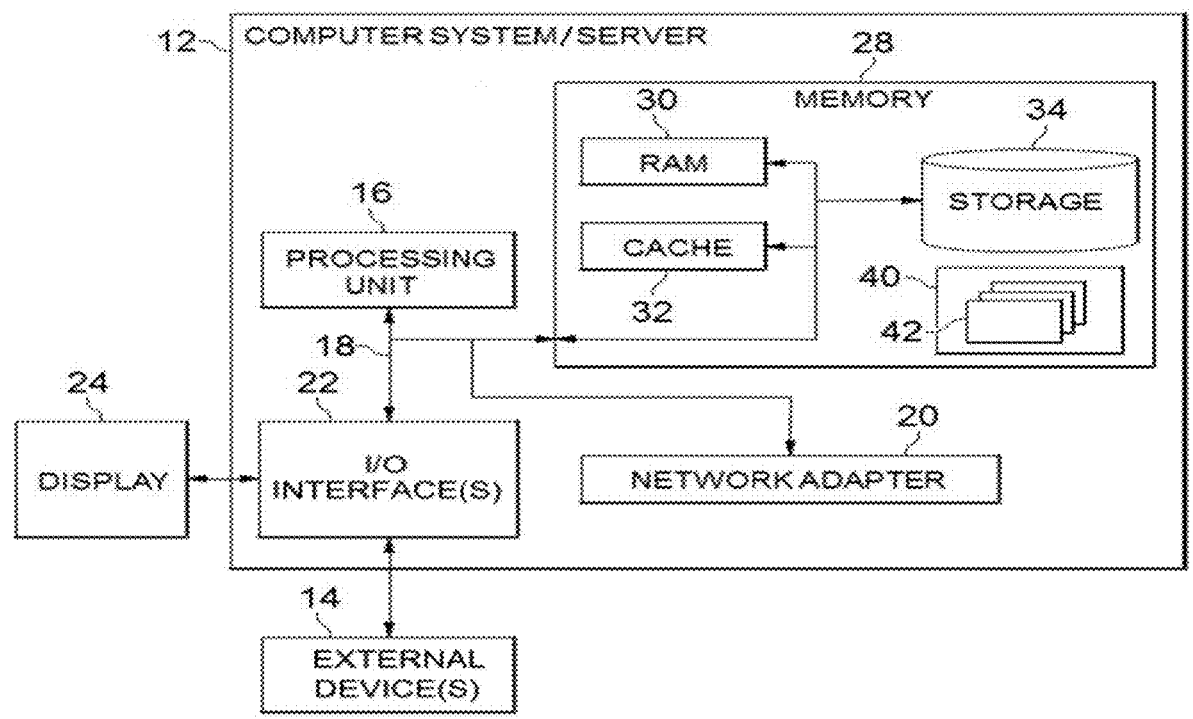
FIG. 1 shows an example computer system which is applicable to implement the embodiments of the present invention.

Referring now to FIG. 1, in which an example computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As mentioned above, in a storage system comprising a non-volatile write cache (NVWC) and a backend storage subsystem, when write data sent from a host arrives, the data is usually written into the NVWC at first and a write completion message is returned to the host. The data stored in the NVWC can be destaged to the backend storage subsystem at a later time. Since the write completion message is returned to the host as soon as the data is written to the NVWC, from the host's point of view, the data write completes very quickly and the host can continue processing other data.

However, the space in the NVWC occupied by certain data cannot be released until the data has been destaged from the NVWC to the backend storage subsystem. On the other hand, the throughput of destaging may decrease if part of the backend storage subsystem is busy. In addition, the incoming throughput of write data may vary over time and may have a rush from time to time. Therefore, the NVWC may be overdriven (i.e., do not have enough space) and become bottleneck of the storage system, which is one of the most common performance issues of the storage system.

NVWC overdrive may occur due to various reasons, such as heavy workload, small NVWC size, etc. When the NVWC is overdriven, the new arrived write data, including those data whose addresses are in the non-busy part of the backend storage subsystem, may have to wait in a host adapter of the storage system without returning the write completion message to the host until there is available space in the NVWC. Accordingly, the response time of the write command may become very long, or even the host may lose access to the storage system if a time threshold is exceeded, which may cause performance degradation and affect applications associated with the storage system. Therefore, there is a need for relieving the NVWC overdrive.

Figure 2:
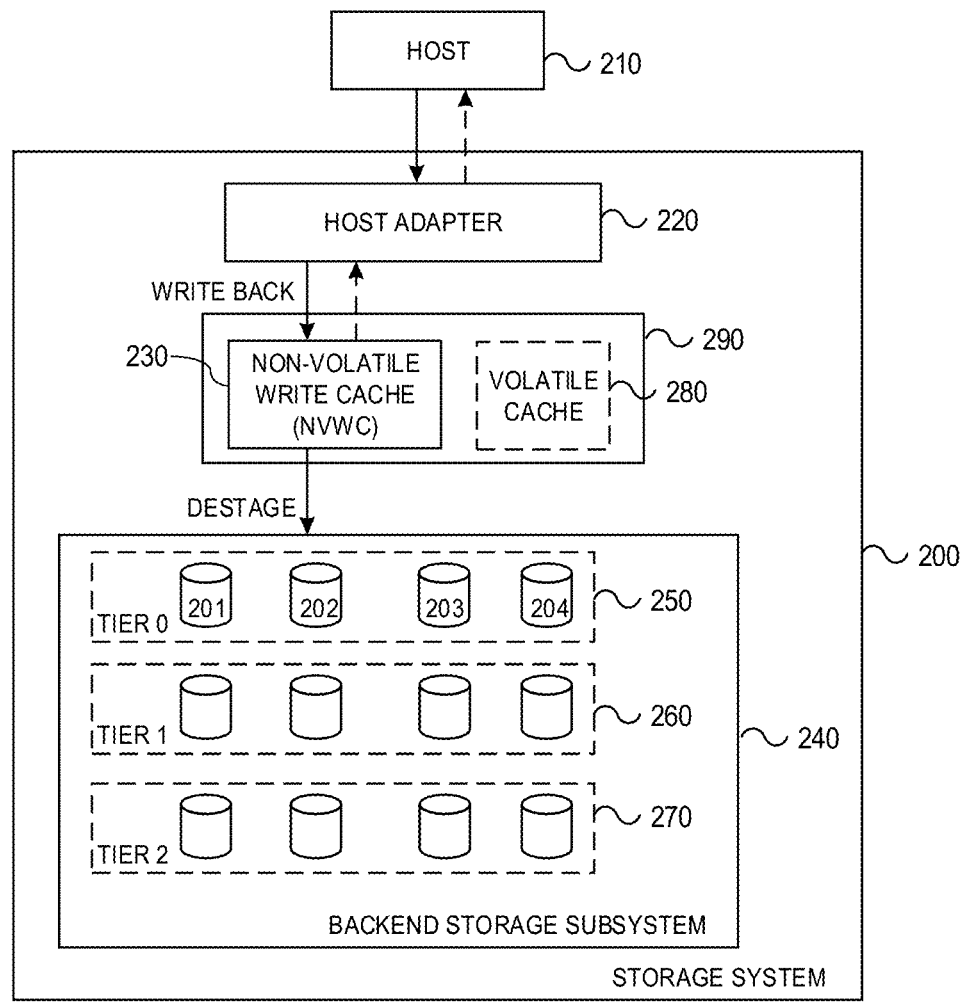
FIG. 2 is a block diagram illustrating an example storage system according to an embodiment of the present invention.

FIG. 2 is a block diagram illustrating an example storage system 200 according to an embodiment of the present invention. A host 210 may send a write command to the storage system 200. The host 210 may be any entity that can write data into the storage system 200, such as a host computer system, a host server, a processor, a web browser, an operating system, etc. The storage system 200 may include a host adapter 220, a main memory 290 (such as Random Access Memory (RAM), Dynamic Random Access Memory (DRAM), Synchronous Dynamic Random Access Memory (SDRAM), etc.) and a backend storage subsystem 240 (such as RAID arrays, one or more disks, etc.). The host adapter 220 may communicate with the host 210. It would be appreciated that the host adapter 220 may be any appropriate interface that can facilitate the communication between the host 210 and the storage system 200.

The main memory 290 may typically include an NVWC 230 and a volatile cache 280. The storage system 200 is usually powered by a primary power source. The NVWC 230 may be part of the space in the main memory 290 that is reserved to store the write data coming from the host 210 and protected by a standalone power source other than the primary power source, e.g., a battery. As such, write data stored in the NVWC 230 can be kept safe when the primary power source stops providing power to the storage system 200 due to system shutdown, unintended outage, etc. The volatile cache 280 may be part of the space in the main memory 290 that is not protected by a standalone power source. The volatile cache 290 can be used as a regular cache, and both read data and write data can be stored in the volatile cache. It should be noted that, the volatile cache 280 is optional and not necessarily required for implementing the invention. It should also be noted that, although FIG. 2 shows that the NVWC 230 and the volatile cache 280 are both parts of the main memory 290, it is merely an example and they can be standalone components.

The backend storage subsystem 240 may comprise a plurality of storage tiers 250, 260 and 270 that have different writing speeds. According to an embodiment of the invention, the storage tier 250 referred to as Tier 0 may have the fastest writing speed, the storage tier 260 referred to as Tier 1 may have a writing speed between those of the storage tiers 250 and 270, and the storage tier 270 referred to as Tier 2 may have the slowest writing speed. Each storage tier may have a different storage medium type. For example, Tier 0 may consist of SSD (Solid State Drive) RAID (Redundant Array of Independent Disks) arrays, consist of 3D-Xpoint RAID arrays, consist of phase-change memory (PCM) RAID arrays, or consist of other flash drive RAID arrays, Tier 1 may consist of Enterprise DDM (Disk Drive Module)

RAID arrays, and Tier 2 may consist of Nearline DDM RAID arrays. Each of the storage tiers 250, 260 and 270 may comprise a plurality of storage units. For example, Tier 0 may comprise storage units 201, 202, 203 and 204. In the case where Tier 0 consists of SSD RAID arrays, each storage unit may be an SSD RAID array. Although FIG. 2 illustrates that the backend storage subsystem 240 comprise three tiers each having four storage units, the number of tiers and storage units in each tier is not limited to this, and the number of storage units in different tiers may be the same or different, without any limitation.

The typical mechanism of writing data into the storage system 200 is described here in more detail. In FIG. 2, the solid arrows indicate the write data flow while the dash arrows indicate the write completion messages. The host 210 may send a write command along with write data to the host adapter 220, and each write data may be associated with an address (e.g., a logical address which may correspond to a physical address in the backend storage subsystem 240) to which the write data is to be written. The write data may be sent to the NVWC 230 via the host adapter 220 and written into the NVWC 230, and then a write completion message may be returned from the NVWC 230 to the host 210 through the host adapter 220. With the receipt of the write completion message, the host 210 believes that the write is completed, although the data may have not been written to the intended address in the backend storage subsystem. Later, the data stored in the NVWC 230 may be destaged to the backend storage subsystem 240 and stored in a storage unit in the backend storage subsystem 240. The destage may be performed regularly or in response to a certain condition (e.g., the NVWC is almost full), which is not limited. When the NVWC 230 receives a message from the backend storage subsystem 240 indicating that the write data has been stored successfully, the write data stored in the NVWC 230 may be discarded and the corresponding space in the NVWC 230 may be released to store new arrived write data. This mechanism may be referred to as a "write-back" mechanism.

In contrast, in a so-called "write-through" mechanism, the write completion message is not sent to the host until the data has been written into the backend storage subsystem. In the write-through mechanism, the data is written into the backend storage subsystem without using the NVWC, i.e., bypassing the NVWC. The specific way to realize the write through may be different and depend on the specific storage system. For example, data can be directly written into the backend storage subsystem and then the write completion message can be returned to the host. Alternatively, in the case where a volatile cache is used, data can be first written into the volatile cache and immediately destaged into the backend storage subsystem, and then the write completion message can be returned to the host.

As described above, for the conventional write-back mechanism, when the NVWC is overdriven, the response time of the write command may become very long, causing a severe degradation of system performance.

Figure 3:
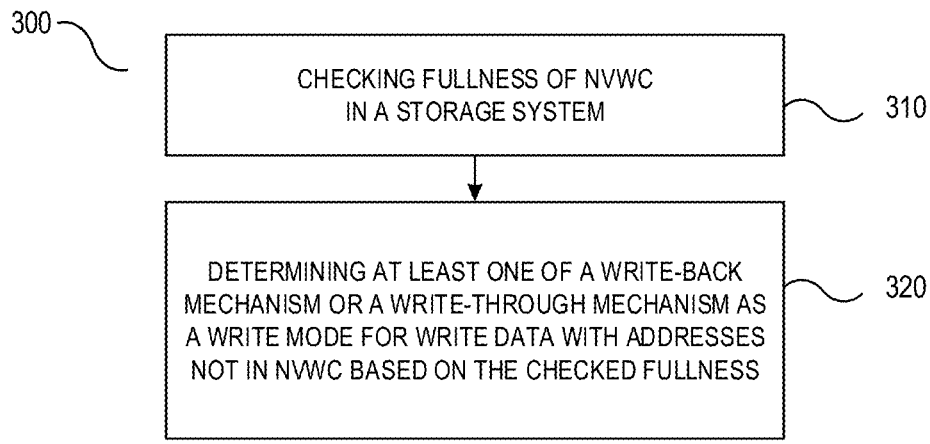
FIG. 3 is a flowchart illustrating an example method for dynamically allocating write data in a storage system according to an embodiment of the present invention.

FIG. 3 is a flowchart illustrating an example method 300 for dynamically allocating write data in a storage system according to an embodiment of the present invention.

At block 310, fullness of a NVWC in a storage system may be checked. For example, the fullness of the NVWC may be a percentage of the total NVWC space that is occupied. According to an embodiment of the invention, the fullness of the NVWC may be compared with one or more thresholds to determine the current status of the NVWC.

At block 320, at least one of a write-back mechanism or a write-through mechanism may be determined as a write mode for write data whose addresses are not in the NVWC based on the checked fullness of the NVWC. Thus, the write data may be written into the storage system using the write-back mechanism, the write-though mechanism or the combination thereof, as described in more detail below. Generally, for a higher fullness of the NVWC, it is more likely to use the write-through mechanism (i.e., bypass the NVWC) to write data into the backend storage subsystem, so as to relieve overdrive of the NVWC. It should be noted that, for those data whose addresses are already in the NVWC, they may always be written into the NVWC using the write-back mechanism by overwriting their previous values in the NVWC, and there is no need to determine a write mode for them based on the fullness of the NVWC. Therefore, the write mode determination based on the NVWC fullness may only apply to the write data whose addresses are not in the NVWC. In the following discussion, the term "first data" is used to refer to the write data whose addresses are not in the NVWC.

According to an embodiment, the write mode may include a first mode, a second mode and a third mode. In the first, second and third modes, the first data may be written into the storage system in different ways, so as to adjust the throughput of writing into the NVWC. Specifically, in the first mode, all of the first data may be written into the NVWC using the write-back mechanism. In the second mode, at least part of the first data may be written into the NVWC using the write-back mechanism, while the rest of the first data may be written into the backend storage subsystem using a write-through mechanism. In the third mode, all of the first data may be written into the backend storage subsystem using the write-through mechanism. By selectively using the write-back mechanism and/or write-through mechanism for the first data, the NVWC overdrive can be relieved. The first mode, the second mode and the third mode will be described below in more detail with reference to FIGS. 4-6.

Figure 4:
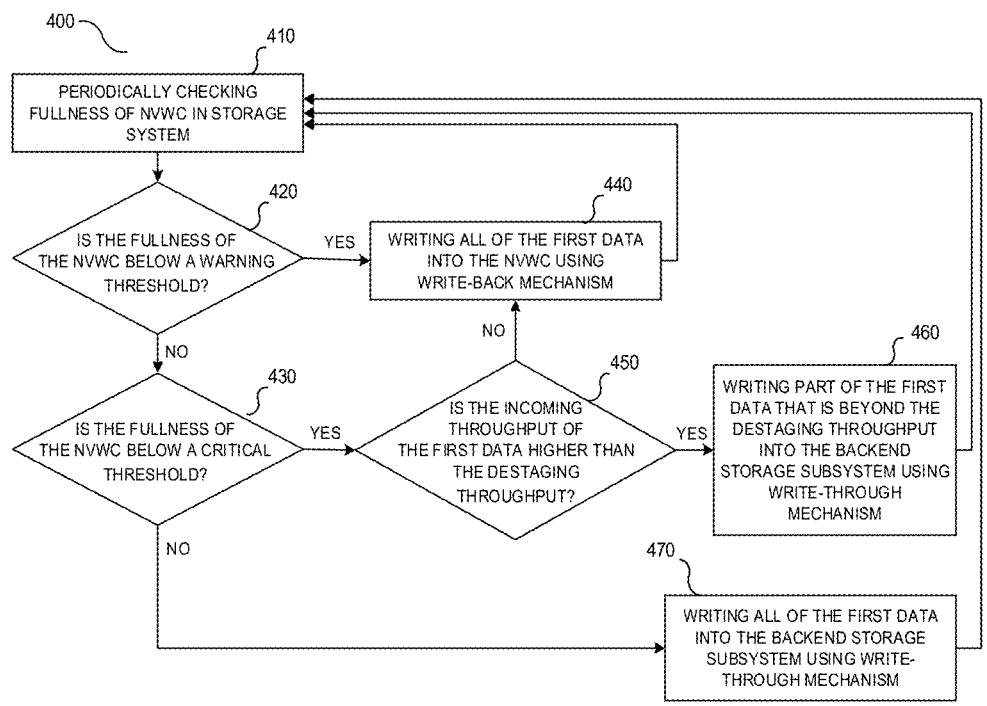
FIG. 4 is a flowchart illustrating an example method for dynamically allocating write data in a storage system according to an embodiment of the present invention.

FIG. 4 is a flowchart illustrating an example method 400 for dynamically allocating write data in a storage system according to an embodiment of the present invention. The method 400 may be implemented by a processor of the storage system, or by a processor in a machine in communication with the storage system, etc. The method 400 may be applied to a storage system comprising an NVWC and a backend storage subsystem, such as the storage system 200 as shown in FIG. 2.

At block 410, fullness of the NVWC in the storage system may be checked, which is similar to block 310. The checking may be performed periodically, e.g., at predetermined time intervals. The fullness can be used to determine the write mode for writing first data into the storage system, which will be described below.

At block 420, a determination may be made regarding whether the fullness of the NVWC is below a warning threshold. The warning threshold may be a certain occupation percentage (e.g., 85%) of the total NVWC space, or any other appropriate criteria. If it is determined that the fullness of the NVWC is below the warning threshold, the method proceeds to block 440; otherwise, the method proceeds to block 430.

At block 440, a first mode may be used, and all of the first data may be written into the NVWC using a write-back mechanism. Specifically, in the write-back mechanism, the data may be written into the NVWC and a write completion message may be returned to the host, as described above with respect to FIG. 2.

At block 430, it may be determined whether the fullness of the NVWC is below a critical threshold. The critical threshold may also be a certain occupation percentage (e.g., 95%) of the total NVWC space, or any other appropriate criteria. The critical threshold may be greater than the warning threshold. If it is determined that the fullness of the NVWC is below the critical threshold, a second mode may be used, and the method proceeds to block 450; otherwise, a third mode may be used, and the method proceeds to block 470.

In the second mode, at least part of the first data may be written into the NVWC using the write-back mechanism while the rest of the first data may be written into the backend storage subsystem using the write-through mechanism. The second mode will be described in more detail with reference to FIG. 5, which is a block diagram illustrating the example storage system 200 in a second mode according to an embodiment of the present invention.

Figure 5:
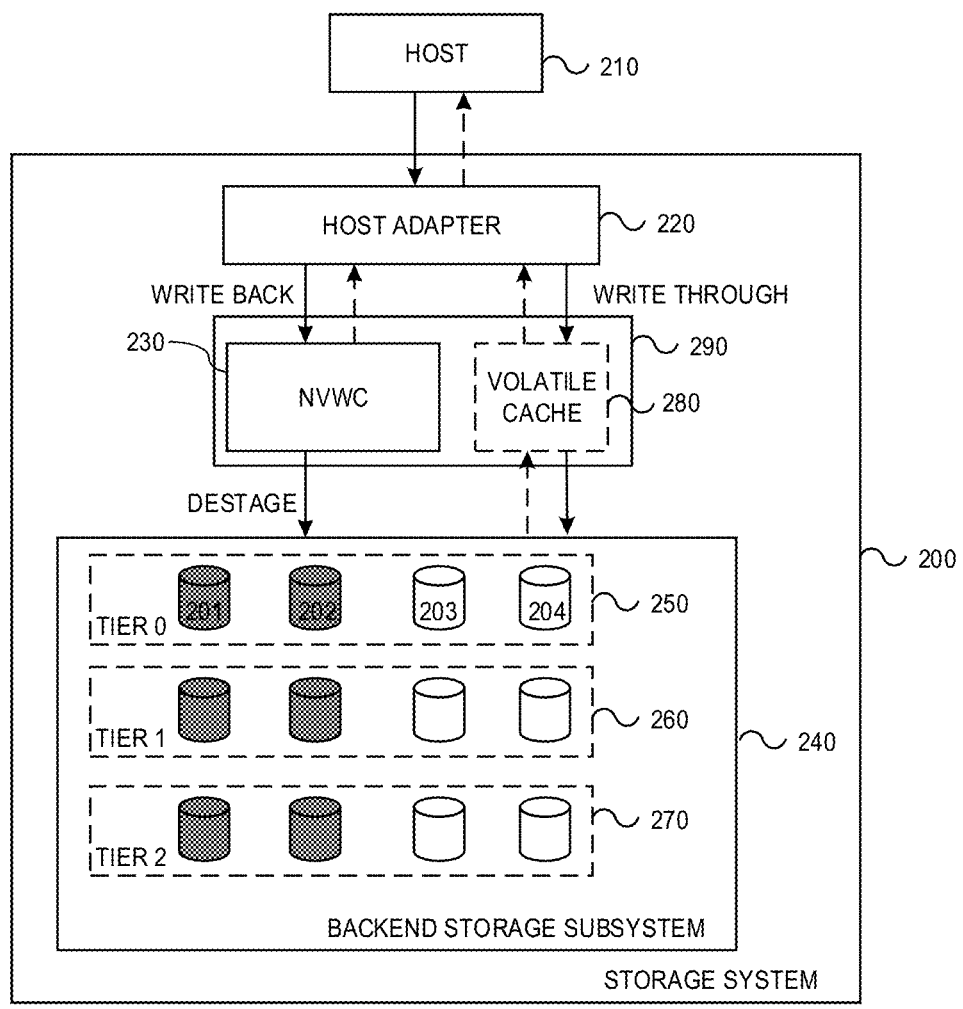
FIG. 5 is a block diagram illustrating an example storage system in a second mode according to an embodiment of the present invention.

At block 450, it may be determined whether the throughput of the first data is higher than a destaging throughput from the NVWC to the backend storage subsystem. If no, the method proceeds to block 440, where all of the first data may be written into the NVWC using the write-back mechanism; otherwise, the method proceeds to block 460, where part of the first data that is beyond the destaging throughput may be written into the backend storage subsystem using the write-through mechanism. Referring to FIG. 5, part of the first data from the host 210 is written into the NVWC 230 using the write-back mechanism, and the rest of the first data from the host 210 is written into the backend storage subsystem 240 using the write-through mechanism. Although FIG. 5 shows that the write through to the backend storage subsystem 240 using the volatile cache 280 as a temporary buffer, it should be noted the write through can also be realized without the volatile cache 280, i.e. directly writing the first data into the backend storage subsystem 240. By writing part of the first data using the write-through mechanism, the throughput of writing into the NVWC may be decreased, so as to avoid or at least relieve overuse and congestion of the NVWC.

The first data may comprise random write data and sequential write data. Random write data may refer to data having random write addresses, such as write data generated by online processing, while sequential write data may refer to data having sequential write addresses, such as write data generated by batch processing. Normally, a random write command is more sensitive to the response time than a sequential write command, and the write-through mechanism has a longer response time than the write-back mechanism. According to an embodiment of the invention, at block 460, the random write data may be given a higher priority to be written into the NVWC than the sequential write data. For example, the sequential write data will not be written into the NVWC until all of the random write data has been written into the NVWC. As such, the response time of random write command may be less affected when the NVWC is very busy or even overdriven. If the incoming throughput of the random write data is greater than the destaging throughput, part of the first data that is beyond the destaging throughput, including part of the random write data and all of the sequential write data, may be written into the backend storage subsystem using the write-through mechanism.

According to an embodiment of the invention, for the write-through mechanism, at least one storage unit in at least the fastest available storage tier in the backend storage subsystem can be determined as busy or non-busy. In another embodiment, the determination of busy or non-busy can be performed for each storage unit in at least the fastest storage tier. In yet another embodiment, the determination of busy or non-busy can be performed for each storage unit in each storage tier. There are various ways to determine a storage unit as busy or non-busy. According to an embodiment, a storage unit in a storage tier can be determined as busy or non-busy based on the comparison of the response time of the storage unit with the normal response time range of the storage tier. For example, if the response time of the storage unit is less than the median of the normal response time range of the storage tier, then the storage unit may be determined as non-busy. Here, the response time of the storage unit may be an average response time of the storage unit over a certain period. In addition to or alternative to using the response time as a criterion, a storage unit in a storage tier can be determined as busy or non-busy based on the comparison of the throughput of the storage unit with the bandwidth of the storage unit in the storage tier. Here, the bandwidth may refer to the maximum amount of data that can be processed by the storage unit in a certain period of time, for example, 2000 MB/s. For example, if the throughput of the storage unit is less than 70% of the bandwidth of the storage unit, it can be determined as non-busy. In addition or alternatively, the busy or non-busy state of a storage unit can be determined based on a comparison of an I/O rate of the storage unit with a maximum normal I/O rate of the storage unit. It would be appreciated that any other appropriate criteria may be used for determining whether a storage unit is busy or non-busy.

When the first data is to be written using the write-through mechanism, it may be determined whether the physical address of the data was previously assigned in the backend storage subsystem 240. For a storage system whose physical space is not pre-allocated, the physical address for the write data is usually not assigned until the data needs to be written into the storage system. Only if the write command is to overwrite the previous data in the backend storage subsystem, the physical address of the data may have been assigned before the write operation. In such a case, the data is written to the previously assigned physical address using the write-through mechanism. On the other hand, if the physical address of the data was not previously assigned, according to an embodiment of the invention, one or more non-busy storage units in the fastest available storage tier can be selected and allocated to write the data. For example, if Tier 0 has available space, then the data will be written into the non-busy storage units in Tier 0. If Tier 0 has no space available, then the data will be written into the non-busy units in Tier 1. According to an embodiment, the first data may be substantially evenly allocated among the non-busy storage units in the fastest available storage tier. For example, the allocation may use a round-robin method or any other appropriate method. Such a dynamic write-though mechanism is particularly suitable for storage systems in which the physical space is not pre-allocated. An example of such storage systems is a storage system having thin provisioning volumes. As another example, in some solutions of archive, backup or disaster recovery, the target (secondary) volumes or systems are the thin provisioning volumes and the new coming write commands always allocate new addresses without overwriting the previous data in the backend storage subsystem. Thus, the physical addresses of all the first data are allocated when writing, which can take great advantage of the dynamic write-through mechanism.

By choosing the non-busy storage units in the fastest available storage tier, the response time of writing data using the write-through mechanism can be ensured without over-driving the NVWC. This advantage is especially significant in combination with the use of fast storage medium, like 3D-Xpoint, phase-change memory (PCM) or flash drive, in Tier 0. Moreover, the busy storage units can be prevented from being overused, and the problem that some busy storage units degrade the write performance of the whole storage system can be alleviated. Furthermore, by substantially evenly allocating the write data among the non-busy storage units, the workload across the non-busy storage units can be balanced.

Referring to FIG. 5, the storage units that are determined as busy, such as the storage units 201 and 202, are shown as shaded, while the storage units that are determined as non-busy, such as the storage units 203 and 204, are shown as not-shaded. If, for example, Tier 0 is the fastest available storage tier, then the first data to be written using the write-through mechanism may be written into the storage units 203 and 204. More specifically, if four blocks of write data, DATA1, DATA2, DATA3 and DATA4, are to be written to the backend storage subsystem 240 using the write-through mechanism, DATA1 and DATA3 may be written into the storage unit 203, and DATA2 and DATA4 may be written into the storage unit 204.

Figure 6:
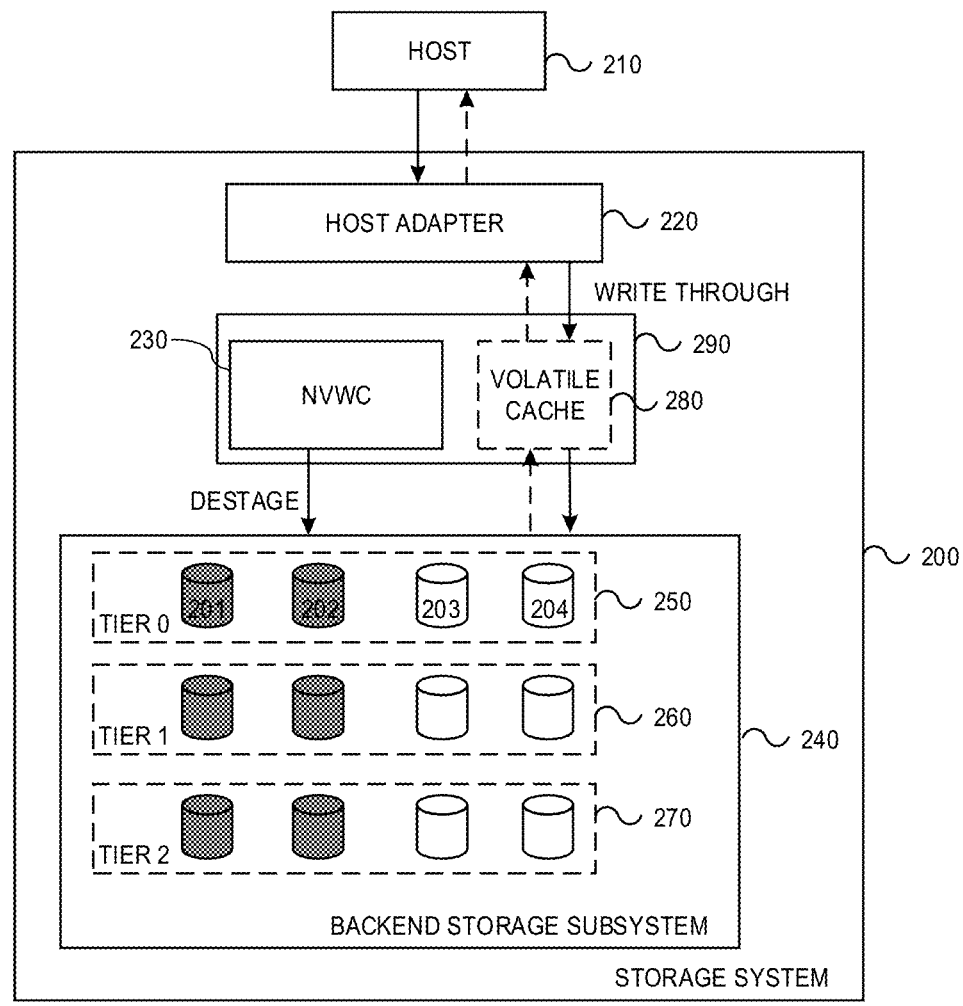
FIG. 6 is a block diagram illustrating an example storage system in a third mode according to an embodiment of the present invention.

Refer back to FIG. 4. At block 470, in the third mode, all of the first data may be written into the backend storage subsystem using the write-through mechanism. The third mode will be described below with reference to FIG. 6, which is a block diagram illustrating the example storage system 200 in a third mode according to an embodiment of the present invention. In FIG. 6, in response to the fullness of the NVWC 230 beyond the critical threshold, all of the first data from the host 210 may be written into the backend storage subsystem 240 using the write-through mechanism. For the write-through mechanism, non-busy storage units in the fastest available storage tier can be selected to reduce the response time, like in the second mode. Although FIG. 6 shows that the write through to the backend storage subsystem 240 using the volatile cache 280 as a temporary buffer, it should be noted the write through can also be realized without the volatile cache 280, i.e. directly writing the first data into the backend storage subsystem 240. The dynamic write-through process in the third mode is similar to that in the second mode and thus the detail is omitted here for brevity. Although no new first data is written into the NVWC, data already stored in the NVWC 230 may continue to destage into the backend storage subsystem 240 and the fullness of the NVWC 230 may change over time. Since the fullness of the NVWC 230 may be checked periodically, the determination of write mode can be dynamical to maximize the write performance of the storage system.

The method described herein may be applicable to a variety of storage systems, and it may be particularly suitable for storage systems in which the physical space for write data is not allocated until the data needs to be written into the storage system (e.g., a storage system with thin provisioning configuration). The method described herein may be applicable to different storage media, such as SSD or DDM, and it may be particularly suitable for a storage system having storage units faster than conventional hard disks (e.g., SSDs, flash memories, 3D-Xpoint drives, phase-change memories (PCMs)).

The present invention may be a system, a method, and/or a computer program product at any possible technical detail level of integration. The computer program product may include a computer readable storage medium (or media) having computer readable program instructions thereon for causing a processor to carry out aspects of the present invention.

According to an embodiment of the present invention, there is provided a computing system. The computing system comprises a processor and a computer-readable memory unit coupled to the processor, the memory unit comprising instructions, when executed by the processor, for allocating write data in a storage system. The storage system comprises a Non-Volatile Write Cache (NVWC) and a backend storage subsystem, and the write data comprises first data whose addresses are not in the NVWC. The instructions for allocating the write data in the storage system further comprise instructions for: checking fullness of the NVWC; and determining at least one of a write-back mechanism or a write-through mechanism as a write mode for the first data based on the checked fullness.

According to an embodiment of the present invention, the write mode comprises a first mode, a second mode and a third mode. In the first mode, all of the first data is written into the NVWC using the write-back mechanism, In the second mode, at least part of the first data is written into the NVWC using the write-back mechanism while the rest of the first data is written into the backend storage subsystem using the write-through mechanism. In the third mode, all of the first data is written into the backend storage subsystem using the write-through mechanism.

According to an embodiment of the computing system, the first mode is used in response to the fullness of the NVWC below a first threshold; the second mode is used in response to the fullness of the NVWC between the first threshold and a second threshold, wherein the second threshold is greater than the first threshold; and the third mode is used in response to the fullness of the NVWC beyond the second threshold.

According to an embodiment of the computing system, the first data comprises random write data and sequential write data, and in the second mode, the random write data is given a higher priority to be written into the NVWC than the sequential write data.

According to an embodiment of the computing system, in the second mode: in response to an incoming throughput of the first data being lower than or equal to a destaging throughput from the NVWC to the backend storage subsystem, all of the first data is written into the NVWC using the write-back mechanism; and in response to the incoming throughput of the first data being higher than the destaging throughput, part of the first data that is beyond the destaging throughput is written into the backend storage subsystem using the write-through mechanism.

According to an embodiment of the computing system, the backend storage subsystem comprises a plurality of storage tiers that have different writing speeds, each of the plurality of storage tiers comprising a plurality of storage units. The instructions for allocating the write data in the storage system further comprises instructions for determining whether at least one storage unit in at least a fastest available storage tier is busy or non-busy, wherein for the write-through mechanism, at least part of the first data without previously assigned physical address is written into one or more non-busy storage units in the fastest available storage tier.

According to an embodiment of the computing system, the determination of busy or non-busy is performed for each storage unit in at least the fastest available storage tier, and the at least part of the first data is substantially evenly allocated among the non-busy storage units in the fastest available storage tier.

According to an embodiment of the computing system, a storage unit in a storage tier is determined as busy or non-busy based on at least one of: a comparison of a response time of the storage unit with a normal response time range of the storage tier; a comparison of a throughput of the storage unit with a bandwidth of the storage tier; and a comparison of an I/O rate of the storage unit with a maximum normal I/O rate of the storage unit.

According to an embodiment of the computing system, the checking of the fullness is performed periodically.

According to an embodiment of the computing system, the backend storage subsystem has thin provisioning volumes.

According to an embodiment of the present invention, there is provided a computer program product. The computer program product comprises a computer readable storage medium having program instructions embodied therewith, the program instructions executable by a processor to cause the processor to allocate write data in a storage system. The storage system comprises a Non-Volatile Write Cache (NVWC) and a backend storage subsystem, and the write data comprises first data whose addresses are not in the NVWC. The instructions to cause the processor to allocate the write data in the storage system further comprise instructions to cause the processor to perform actions of: checking fullness of the NVWC; and determining at least one of a write-back mechanism or a write-through mechanism as a write mode for the first data based on the checked fullness.

According to an embodiment of the computer program product, the write mode comprises a first mode, a second mode and a third mode. In the first mode, all of the first data is written into the NVWC using the write-back mechanism, In the second mode, at least part of the first data is written into the NVWC using the write-back mechanism while the rest of the first data is written into the backend storage subsystem using the write-through mechanism. In the third mode, all of the first data is written into the backend storage subsystem using the write-through mechanism.

According to an embodiment of the computer program product, the first mode is used in response to the fullness of the NVWC below a first threshold; the second mode is used in response to the fullness of the NVWC between the first threshold and a second threshold, wherein the second threshold is greater than the first threshold; and the third mode is used in response to the fullness of the NVWC beyond the second threshold.

According to an embodiment of the computer program product, the first data comprises random write data and sequential write data, and in the second mode, the random write data is given a higher priority to be written into the NVWC than the sequential write data.

According to an embodiment of the computer program product, in the second mode: in response to an incoming throughput of the first data being lower than or equal to a destaging throughput from the NVWC to the backend storage subsystem, all of the first data is written into the NVWC using the write-back mechanism; and in response to the incoming throughput of the first data being higher than the destaging throughput, part of the first data that is beyond the destaging throughput is written into the backend storage subsystem using the write-through mechanism.

According to an embodiment of the computer program product, the backend storage subsystem comprises a plurality of storage tiers that have different writing speeds, each of the plurality of storage tiers comprising a plurality of storage units. The instructions to cause the processor to allocate the write data in the storage system further comprise instructions to cause the processor to determine whether at least one storage unit in at least a fastest available storage tier is busy or non-busy, wherein for the write-through mechanism, at least part of the first data without previously assigned physical address is written into one or more non-busy storage units in the fastest available storage tier.

According to an embodiment of the computer program product, the determination of busy or non-busy is performed for each storage unit in at least the fastest available storage tier, and the at least part of the first data is substantially evenly allocated among the non-busy storage units in the fastest available storage tier.

According to an embodiment of the computer program product, a storage unit in a storage tier is determined as busy or non-busy based on at least one of: a comparison of a response time of the storage unit with a normal response time range of the storage tier; a comparison of a throughput of the storage unit with a bandwidth of the storage tier; and a comparison of an I/O rate of the storage unit with a maximum normal I/O rate of the storage unit.

According to an embodiment of the computer program product, the checking of the fullness is performed periodically.

According to an embodiment of the computer program product, the backend storage subsystem has thin provisioning volumes.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for allocating write data in a storage system, wherein the storage system comprises a non-volatile write cache (NVWC) and a backend storage subsystem, and the write data comprises first data whose addresses are not in the NVWC, the method comprising:
   checking fullness of the NVWC;
   determining one of a write-back mechanism, a write-through mechanism, or a combination of the write-back mechanism and the write-through mechanism as a write mode for the first data based on the checked fullness relative to a threshold fullness; and
   determining whether at least one storage unit in at least a fastest available storage tier in backend storage subsystem with regards to storage space availability is busy or non-busy,
   wherein for the write-through mechanism, at least part of the first data without a previously assigned physical address is written into one or more non-busy storage units in the fastest available storage tier.

2. The method of claim 1, wherein:
   the write mode comprises a first mode, a second mode and a third mode;
   in the first mode, all of the first data is written into the NVWC using the write-back mechanism;
   in the second mode, at least part of the first data is written into the NVWC using the write-back mechanism while the rest of the first data is written into the backend storage subsystem using the write-through mechanism; and
   in the third mode, all of the first data is written into the backend storage subsystem using the write-through mechanism.

3. The method of claim 2, wherein:
   the first mode is used in response to the fullness of the NVWC below a first threshold;

the second mode is used in response to the fullness of the NVWC between the first threshold a second threshold, wherein the second threshold is greater than the first threshold; and the third mode is used in response to the fullness of the NVWC beyond the second threshold.

4. The method of claim 2, wherein:

the first data comprises random write data and sequential write data; and in the second mode, the random write data is given a higher priority to be written into the NVWC than the sequential write data.

5. The method of claim 2, wherein in the second mode:

in response to an incoming throughput of the first data being lower than or equal to a destaging throughput from the NVWC to the backend storage subsystem, all of the first data is written into the NVWC using the write-back mechanism; and in response to the incoming throughput of the first data being higher than the destaging throughput, part of the first data that is beyond the destaging throughput is written into the backend storage subsystem using the write-through mechanism.

6. The method of claim 1, wherein:

the backend storage subsystem comprises a plurality of storage tiers including different writing speeds; and each of the plurality of storage tiers comprises a plurality of storage units.

7. The method of claim 6, wherein:

the determination of busy or non-busy is performed for each storage unit in at least the fastest available storage tier; and the at least part of the first data is substantially evenly allocated among the non-busy storage units in the fastest available storage tier.

8. The method of claim 6, wherein a storage unit in a storage tier is determined as busy or non-busy based on at least one of:

a comparison of a response time of the storage unit with a normal response time range of the storage tier;

a comparison of a throughput of the storage unit with a bandwidth of the storage unit; and a comparison of an I/O rate of the storage unit with a maximum normal I/O rate of the storage unit.

9. The method of claim 1, wherein the checking of the fullness is performed periodically.

10. The method of claim 1, wherein the backend storage subsystem includes thin provisioning volumes.

11. A computing system, comprising:

a processor; and a computer-readable memory unit coupled to the processor, the memory unit comprising instructions, when executed by the processor, for allocating write data in a storage system, wherein:

the storage system comprises a non-volatile write cache (NVWC) and a backend storage subsystem, and the write data comprises first data whose addresses are not in the NVWC, the instructions for allocating the write data in the storage system further comprise instructions for:

checking fullness of the NVWC, determining one of a write-back mechanism, a write-through mechanism, or a combination of the write-back mechanism and the write-through mechanism as a write mode for the first data based on the checked fullness relative to a threshold fullness, and determining whether at least one storage unit in at least a fastest available storage tier with regards to storage space availability is busy or non-busy, and for the write-through mechanism, at least part of the first data without a previously assigned physical address is written into one or more non-busy storage units in the fastest available storage tier.

12. The computing system of claim 11, wherein:

the write mode comprises a first mode, a second mode and a third mode;

in the first mode, all of the first data is written into the NVWC using the write-back mechanism;

in the second mode, at least part of the first data is written into the NVWC using the write-back mechanism while the rest of the first data is written into the backend storage subsystem using the write-through mechanism; and in the third mode, all of the first data is written into the backend storage subsystem using the write-through mechanism.

13. The computing system of claim 12, wherein:

the first mode is used in response to the fullness of the NVWC below a first threshold;

the second mode is used in response to the fullness of the NVWC between the first threshold and a second threshold, wherein the second threshold is greater than the first threshold; and the third mode is used in response to the fullness of the NVWC beyond the second threshold.

14. The computing system of claim 12, wherein:

the first data comprises random write data and sequential write data; and in the second mode, the random write data is given a higher priority to be written into the NVWC than the sequential write data.

15. The computing system of claim 11, wherein:

the backend storage subsystem comprises a plurality of storage tiers including different writing speeds; and each of the plurality of storage tiers comprises a plurality of storage units.

16. A computer program product, comprising a non-transitory computer-readable storage medium including program instructions embodied therewith, the program instructions executable by a processor to cause the processor to:

allocate write data in a storage system, wherein:

the storage system comprises a non-volatile write cache (NVWC) and a backend storage subsystem, and the write data comprises first data whose addresses are not in the NVWC, the instructions to cause the processor to allocate the write data in the storage system further comprise instructions to further cause the processor to:

check fullness of the NVWC, determine one of a write-back mechanism, a write-through mechanism, or a combination of the write-back mechanism and the write-through mechanism as a write mode for the first data based on the checked fullness relative to a threshold fullness, and determine whether at least one storage unit in at least a fastest available storage tier with regards to storage space availability is busy or non-busy, and for the write-through mechanism, at least part of the first data without a previously assigned physical address is written into one or more non-busy storage units in the fastest available storage tier.

17. The computer program product of claim 16, wherein:
the write mode comprises a first mode, a second mode and a third mode;
in the first mode, all of the first data is written into the NVWC using the write-back mechanism;
in the second mode, at least part of the first data is written into the NVWC using the write-back mechanism while the rest of the first data is written into the backend storage subsystem using the write-through mechanism; and
in the third mode, all of the first data is written into the backend storage subsystem using the write-through mechanism.

18. The computer program product of claim 17, wherein:
the first mode is used in response to the fullness of the NVWC below a first threshold;
the second mode is used in response to the fullness of the NVWC between the first threshold and a second threshold, wherein the second threshold is greater than the first threshold; and
the third mode is used in response to the fullness of the NVWC beyond the second threshold.

19. The computer program product of claim 17, wherein:
the first data comprises random write data and sequential write data; and
in the second mode, the random write data is given a higher priority to be written into the NVWC than the sequential write data.

20. The computer program product of claim 16, wherein:
the backend storage subsystem comprises a plurality of storage tiers that have including different writing speeds; and
each of the plurality of storage tiers comprises a plurality of storage units.

\* \* \* \* \*